(12) United States Patent
Liew et al.

(10) Patent No.: US 11,845,558 B2
(45) Date of Patent: Dec. 19, 2023

(54) AIRCRAFT PASSENGER SEAT DEVICE WITH A CONNECTION UNIT COMPRISING AN IMPACT SAFETY DEVICE

(71) Applicant: RECARO Aircraft Seating GmbH & Co. KG, Schwaebisch Hall (DE)

(72) Inventors: Chee Meng Liew, Richardson, TX (US); Hussain Zaveri, Haslet, TX (US); Troy Stanley, Justin, TX (US); Sonay Cakir, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 39 days.

(21) Appl. No.: 17/406,319

(22) Filed: Aug. 19, 2021

(65) Prior Publication Data

US 2023/0057830 A1 Feb. 23, 2023

(51) Int. Cl.
*B64D 11/06* (2006.01)

(52) U.S. Cl.
CPC ...... *B64D 11/0638* (2014.12); *B64D 11/0605* (2014.12); *B64D 11/0624* (2014.12); *B64D 11/0644* (2014.12)

(58) Field of Classification Search
CPC ............ B64D 11/0638; B64D 11/0605; B64D 11/0624; B64D 11/0644
See application file for complete search history.

(56) References Cited

U.S. PATENT DOCUMENTS

| | | | | |
|---|---|---|---|---|
| 3,910,632 A | * | 10/1975 | Marechal | B64D 11/0638 244/118.6 |
| 5,037,157 A | * | 8/1991 | Wain | B60N 2/76 297/188.09 |
| 6,478,256 B1 | * | 11/2002 | Williamson | B64D 11/064 297/216.14 |
| 6,609,749 B1 | * | 8/2003 | Rajasingham | B60N 2/06 296/68.1 |
| 2005/0184566 A1 | * | 8/2005 | Baumann | B64D 11/0638 297/248 |
| 2009/0121523 A1 | | 5/2009 | Johnson | |
| 2016/0039387 A1 | * | 2/2016 | Taubert | B61D 33/005 297/473 |

(Continued)

FOREIGN PATENT DOCUMENTS

WO 2016/133572 A1 8/2016

OTHER PUBLICATIONS

Extended European Search Report dated Dec. 19, 2022 in corresponding EP Patent Application No. 22191292.6.

*Primary Examiner* — Brady W Frazier
*Assistant Examiner* — Shanna Danielle Glover
(74) *Attorney, Agent, or Firm* — POSZ LAW GROUP, PLC

(57) ABSTRACT

Aircraft passenger seat device includes an aircraft seat row, comprising having a mounting unit, and three or more neighboring seat areas. In the two outer seat areas, an aircraft seat with a seat bottom and a backrest is mounted to the mounting unit. In the middle seat area a backrest base body is mounted to the mounting unit. In one or more operating states a detachable center console is detachably mounted to the mounting unit in the middle seat area forming a separation between the two outer seats. The backrest base body has one or more functional elements on its rear side provided for the use by a passenger sitting behind.

16 Claims, 8 Drawing Sheets

(56) References Cited

U.S. PATENT DOCUMENTS

Figure 1:
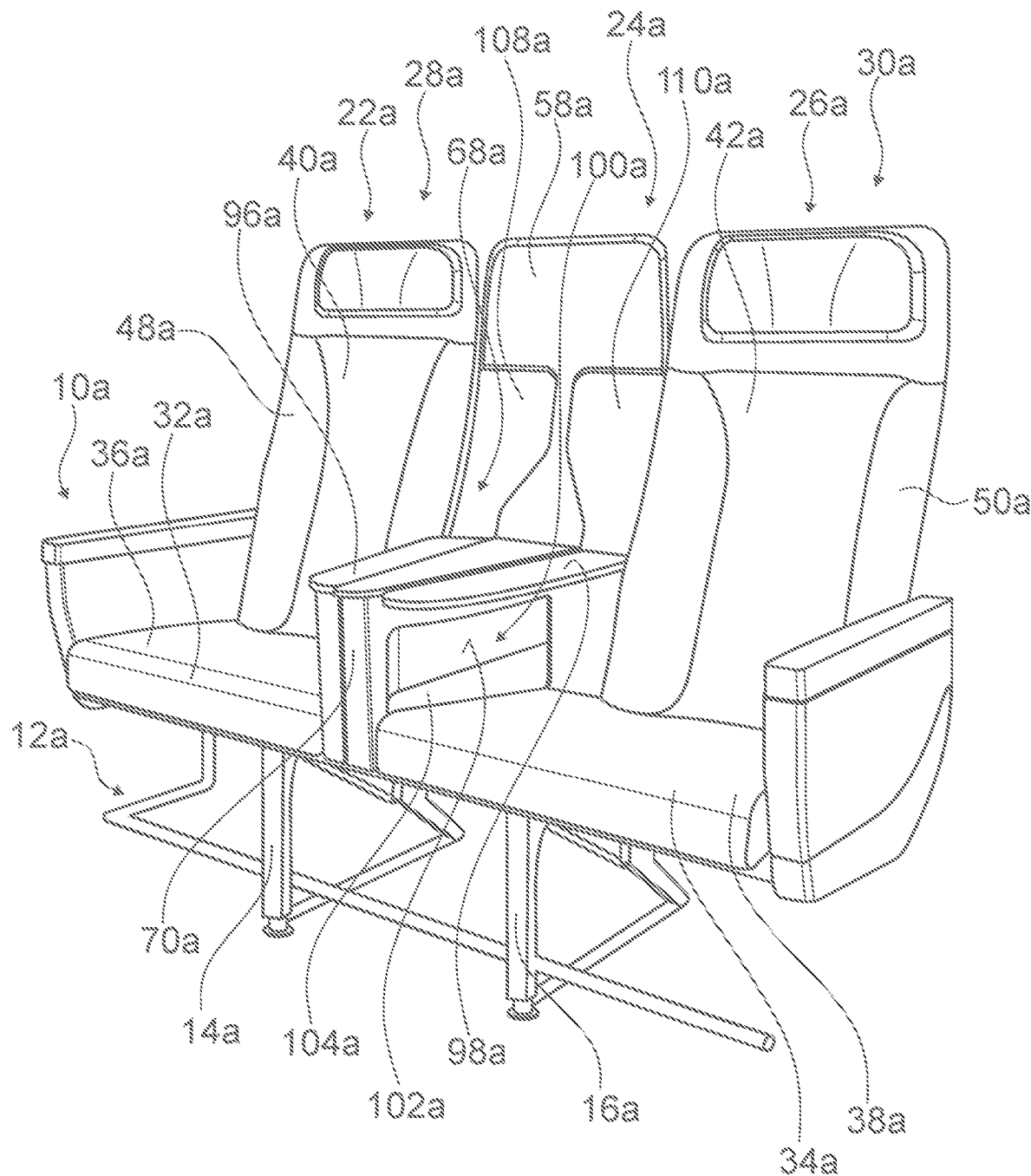

| | | | |
|---|---|---|---|
| 2016/0347454 A1 | 12/2016 | Abreu et al. | |
| 2017/0369172 A1* | 12/2017 | Matthews | B64D 11/0627 |
| 2019/0071181 A1* | 3/2019 | Demary | B64D 11/0612 |
| 2019/0263526 A1* | 8/2019 | Rife | B64D 11/0619 |
| 2020/0385123 A1* | 12/2020 | McKee | B64D 11/0646 |
| 2021/0214086 A1* | 7/2021 | Dowty | B64D 11/0636 |
| 2022/0041286 A1* | 2/2022 | Rebmann | B64D 11/064 |

\* cited by examiner

AIRCRAFT PASSENGER SEAT DEVICE WITH A CONNECTION UNIT COMPRISING AN IMPACT SAFETY DEVICE

PRIOR ART

The invention relates to an aircraft passenger seat device according to claim 1.

From prior art a variety of aircraft passenger seat devices are known.

An objective of this invention is, in particular, to provide an aircraft passenger device which is variable and enhances the comfort for a passenger. The objective is achieved, according to the invention, by the features of claim 1, while advantageous implementations and further developments of the invention may be gathered from the dependent claims.

SUMMARY OF THE INVENTION

An aircraft passenger seat device is proposed, comprising an aircraft seat row, comprising a mounting unit, at least three neighboring seat areas, wherein in the two outer seat areas an aircraft seat with a seat bottom and a backrest is mounted to the mounting unit, and wherein in the middle seat area a backrest base body is mounted to the mounting unit, wherein in at least one operating state a detachable center console is detachably mounted to the mounting unit in the middle seat area forming a separation between the two outer seats and wherein the backrest base body has at least one functional element on its rear side provided for the use by a passenger sitting behind.

An "aircraft seat row" is advantageously to be understood as a row of at least three neighboring seat areas with at least two aircraft seats. A seat row mounted to a cabin floor of an aircraft cabin. A "mounting unit" is advantageously to be understood as a unit, by which the aircraft seat row can be mounted to a cabin floor. The mounting unit is provided to discharge forces acting on the seats of the aircraft seat row into a mounting plane, in particular into the cabin floor. The mounting unit is provided to be connected to a guide rail integrated in the cabin floor. The mounting unit comprises preferably two seat legs, fitting elements connecting the seat legs to the guide rail, and supporting tubes, which form a constructional base of the aircraft seats of the seat row. A "seat area" is advantageously to be understood as an area in which an aircraft seat could be mounted with its backrest and its seat bottom to the mounting unit of the aircraft seat row. Each seat area of one aircraft seat row has preferably the same extension in a traverse direction. The seat areas divide the aircraft seat row in equally long traverse sections. The aircraft seat row is preferably divided by the seating areas in three sections with the same width. The term "neighboring seat areas" is to be understood as seat areas, that directly adjoin each other, with no other seat areas or other areas in-between. An "operating state" is to be understood as a normal operating state in which the seat row and the aircraft seats of the seat row can be used in an aircraft in the designated way. A "detachable center console" is to be understood as a unit which is provided to be arranged in a seat area, in particular in a middle seat area and has at least one functional element, which can be used by a passenger sitting in an aircraft seat in one of the neighboring seat areas. The term "detachably mounted" should be understood as in a mounted state fixedly attached to a mounting unit but demountable therefrom in a non-destructive manner. The detachable center console is preferably mounted to the mounting unit via one or more form-fit and/or force fit elements. The detachable center console is preferably mountable toollessly. On the other hand, it is also conceivable that the detachable center console is mounted to the mounting unit via one or more fasteners, for example screws or bolts and corresponding clamps. A "functional element" is to be understood as an element that is provided to serve a specific function for a passenger. A functional element can be implemented as a table unit, a cup holder, a tablet holder, a power outlet, a literature pocket, a literature net, an advertisement element, an armrest or another element, the person skilled in the art deems usable.

By an "aircraft seat" is herein in particular a passenger seat to be understood which is configured to provide a seating for a passenger within an aircraft cabin. An aircraft seat herein preferably comprises a seat bottom and at least one backrest. By a "seat bottom" is herein in particular a unit to be understood which implements the sitting region for a passenger, wherein the seat bottom is preferably implemented by a base body and a cushion unit that is attached on the base body. By a "sitting region" is herein in particular a region of the seat to be understood which is configured for a passenger to sit on it, in particular during a flight. A 'backrest' is herein in particular to mean a unit of the seat implementing a backrest support surface allowing a passenger sitting on the seat to rest his back against. Herein the backrest preferably comprises at least one backrest base body and a cushion unit that implements the backrest support surface. The backrest is herein arranged on a rear end of the seat bottom and extends from the seat bottom upwards, away from the mounting unit. Herein it is conceivable that the seat bottom and the backrest are connected to one another rigidly or that, to implement different seat positions, the seat bottom and the backrest are embodied to be movable with respect to each other. A "backrest base body" is to be understood as a structural part of a backrest. The backrest base body preferably forms a load bearing structure. The backrest base body preferably contains a load bearing frame and/or load bearing sheets, such as composite sheets. By "provided" is to be understood, in particular, specifically designed and/or equipped. By an object being provided for a certain function is to be understood, in particular, that the object implements and/or carries out said certain function in at least one application state and/or operation state. As a result an advantageous seat row can be implemented with two outer aircraft seats and a center console that provides functional elements for the use by passengers sitting in the passenger seats. The proposed aircraft seat device enhances a comfort and a usability for passengers sitting in aircraft seats of the seat row.

It is proposed that the detachable center console comprises a connection unit by which the detachable center console is connected directly to supporting tubes of the mounting unit. By a "support beam" is herein in particular a part of the mounting unit to be understood that extends transversely to the seat direction of the seats which are mounted via the mounting unit. The support beam is herein in particular configured to transfer loads into the seat legs of the mounting unit and/or to receive torques. A "connection unit" is advantageously to be understood as a unit which has at least one force fit and/or form fit element, via which the unit, especially the center console can be mounted to the supporting tubes. As a result, the detachable center console can be mounted in an advantageous manner.

It is further proposed that the connection unit comprises a front connection element via which the detachable center console can be connected to a front supporting tube and rear connection element via which the detachable center console can be connected to a rear supporting tube. A "connection element" is advantageously to be understood as a force fit and/or form fit element, that can be mounted to a part of the mounting unit, especially the supporting tube, in a form fit and/or force fit manner. As a result, the detachable center console can be attached to the mounting unit in an advantageous way.

Furthermore, it is proposed that the front connection element comprises a hinge element via which the console element can be pivoted relatively to the front supporting tube in a partly mounted state. A "partly mounted state" of the console element is advantageously to be understood as a state in which the console element is connected to the mounting unit only via one sort of connection element, especially via at least one front connection element. As a result, the center console can be advantageously partly demounted and pivoted, such that an area under the center console can be easily reached without completely dismounting the center console.

Furthermore, the connecting unit comprises an impact safety device, which is provided to partially decouple the detachable center console in an event of a crash, so the detachable center console can move forward by a distance X of at least two inches inch. A "impact safety device" is advantageously to be understood as a device that partly decouples the detachable center console from the mounting unit in an event of a crash as to allow a relative movement of the center console relative to the mounting unit, to enhance a safety of the aircraft seat device. The impact safety device is provided to partly decouple the center console from the mounting unit and allow a forward movement of the center console relative to the mounting unit away from a backrest base body of the seat area. Thereby the center console can be moved away from the backrest base body in an event of a crash. By this the backrest base body can pivot forward about a defined angle without contacting the center console, thus allowing the backrest base body to move partially out of the way in an event of a crash. After pivoting forward about the defined angle, the backrest base body comes into a planned contact with the center console and is thereby decelerated. "Partial decoupling" herein is to be understood to mean that a movement of the central console and a movement of the mounting unit are mutually separated at least for a defined time and/or along a defined displacement path, such that the center console may move in relation to the mounting unit over a defined time and/or along a defined displacement path. As a result, the center console can move out of the way of the backrest base body in the event of a crash, thus allowing the backrest base body to pivot forward. By this the backrest base body can be arranged in an event of a crash in an angled way, which reduces the impact forces on the backrest base body for a person sitting behind the backrest base body in an event of a crash.

It is also proposed that the impact safety device comprises a pin element connected to the detachable center console and a slot in an element connected to the mounting unit, in which the pin element is arranged. As a result, the impact safety device can be implemented in an easy way.

Furthermore, it is proposed that the impact safety device has a deformation element delimiting the slot and holding the pin element in a first position in a normal operating condition, the deformation element being provided to be deformed by the pin element in the event of a crash to release the pin element in the slot. As a result, the impact safety device can be implemented in an easy way.

Preferably, the seat bottom of at least one of the two outer seats of the outer seat areas extends into the middle seat area. As a result, the seat bottom of the at least one outer seat can be advantageously wide and as such enhancing a sitting comfort for a passenger.

It is proposed that the backrest of at least one of the two outer seats of the outer seat areas has an extended backrest cushion, extending into the middle seat area. An "extended backrest cushion" is advantageously to be understood as a cushion unit of the backrest that is wider than the backrest base body of the backrest and protrudes into the middle seat area. The cushion unit of the backrest preferably extends onto the backrest base body of the middle seat region, bridging an area between the backrest base body of the outer aircraft seat and the backrest base body of the middle seat area. As a result, the seats of the outer seat areas have an advantageously wide backrest, which improves a comfort for passengers sitting on the outer aircraft seats.

Furthermore, it is proposed that one functional element on the rear side of the backrest base body is implemented as a literature pocket, a table, a PED-holder, a cup holder and/or a literature net. The functional element is in particular provided for the use by a passenger sitting on an aircraft seat behind the proposed aircraft seat of the seat row. A "literature pocket" is advantageously to be understood as a compartment designed to hold literature and other small items. A "PED-holder" is to be understood as a holder in which a personal electronic device, for example a tablet, smartphone or other flat electronic device can be arranged in a safe way such that the tablet, smartphone or other flat electronic device can be used by the passenger. As a result, the functional element can be implemented in an advantageous way.

Furthermore, the detachable center console comprises at least one foldable armrest, a storage compartment, a power outlet and/or a table part. A "foldable armrest" is advantageously to be understood as an armrest that can be pivoted between at least one usage position and a stowage position. A "storage compartment" is advantageously to be understood as a compartment in which a passenger can safely store personal items during a flight. As a result, further functions can be integrated into the detachable center console, thereby enhancing the comfort of passengers sitting on the seats of the neighboring seating areas.

It is also proposed that the backrest base body comprises at least one functional element on the front. As a result, further functions can be integrated into the backrest base body, thereby enhancing the comfort of passengers sitting on the seats of the neighboring seating areas.

Furthermore, it is proposed that the functional element on the front of the backrest base body is a stowage compartment, a tablet holder, a foldable cupholder element and/or advertisement element. As a result, further the functional element can be implemented in an advantageous way.

Preferably, the center console is provided so that a baby basinet, a baby seat or a child seat is fixable thereto. The baby basinet or child seat is preferably mounted to the center console via attachment elements that secure the baby basinet, the baby seat or child seat to the center console in a form- and/or force fit manner in a normal use and in the event of a crash. The center console preferably comprises an attachment module which forms attachment elements, which are provided to be connected to corresponding form fit and/or force fit elements. Preferably the same attachment elements of an attachment module can be used to attach the baby basinet, the baby seat and the child seat to the center console. It would be also conceivable that the baby basinet, the baby seat or child seat is connected to the mounting module via the same connection unit as the center console. In this case the center console could be exchanged for a baby basinet, the baby seat or child seat. As a result, the seat row can advantageously be used by a family.

It is not intended to restrict the aircraft seat device according to the invention to the use and embodiment described above. The content of this disclosure is intended to contain all conceivable combinations of the features mentioned herein. In particular the aircraft seat device can have a number of individual elements, components and units different from that mentioned herein in order to perform a function described herein.

DRAWINGS

Further advantages may become apparent from the following description of the drawings. In the drawings five exemplary embodiments of the invention are shown. The drawings, the description and the claims contain a plurality of features in combination. The person having ordinary skill in the art will purposefully also consider the features separately and will find further expedient combinations.

If there is more than one specimen of a certain object, at least in some cases only one of these is given a reference numeral in the figures and the description. The description of this specimen may be correspondingly transferred to the other specimens of the object.

Figure 2:
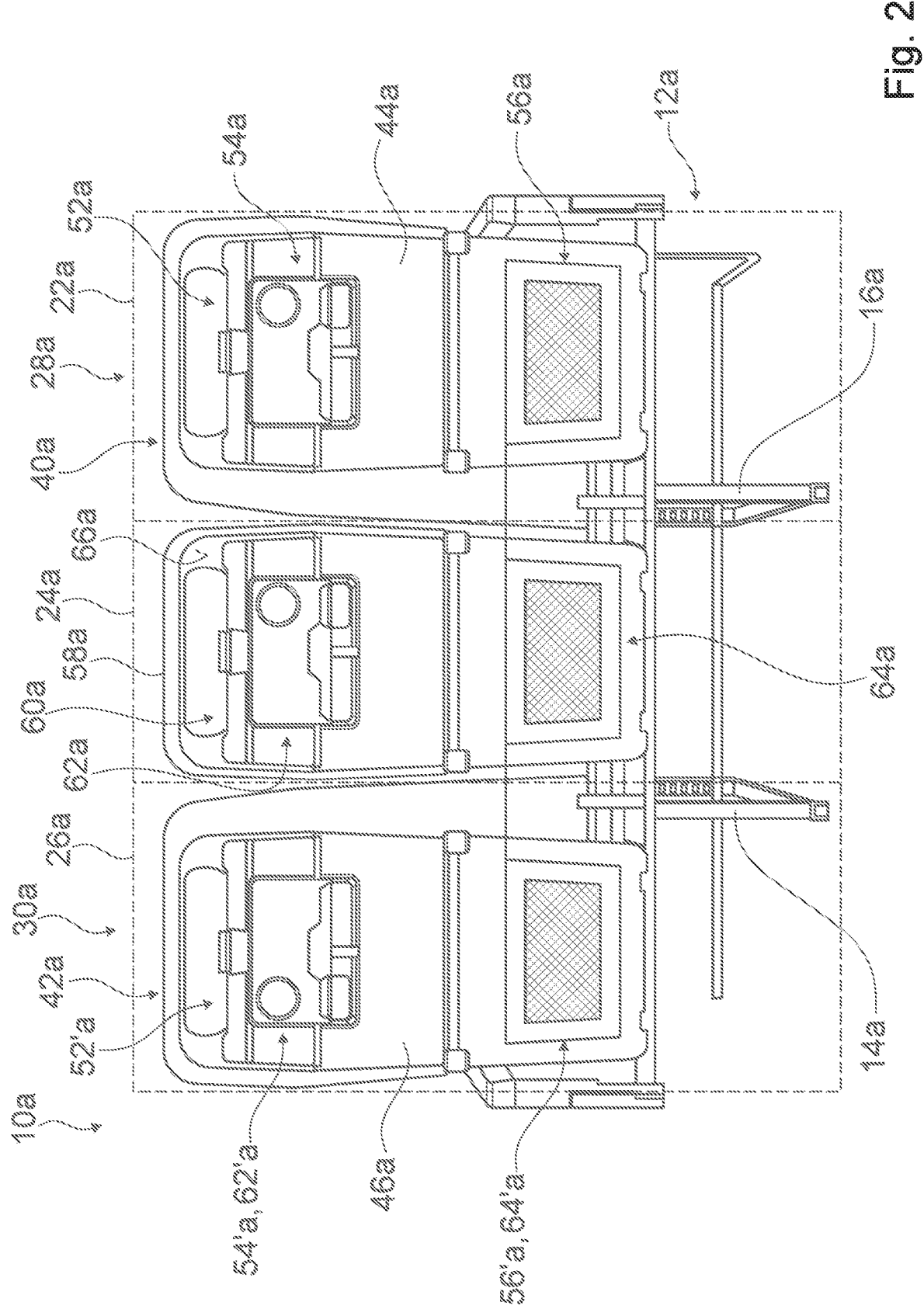
Figure 3:
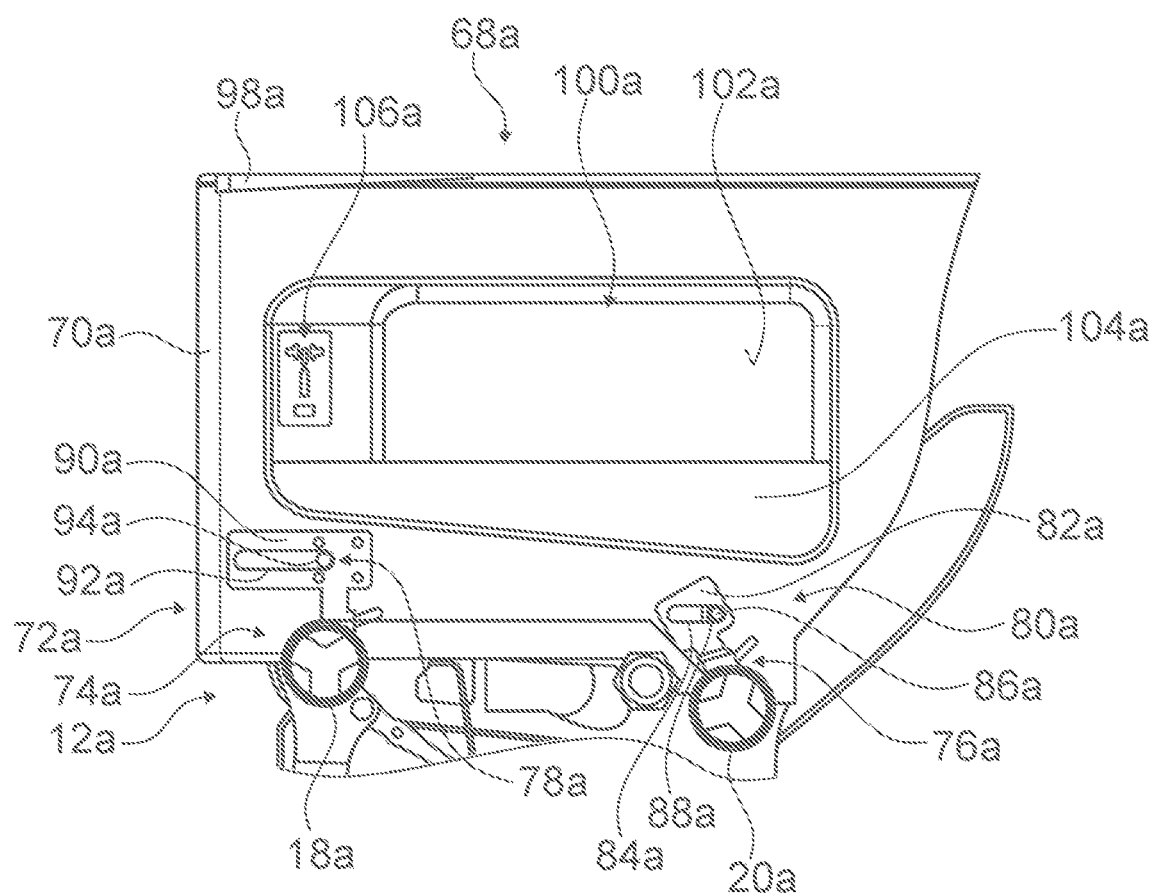
Figure 4:
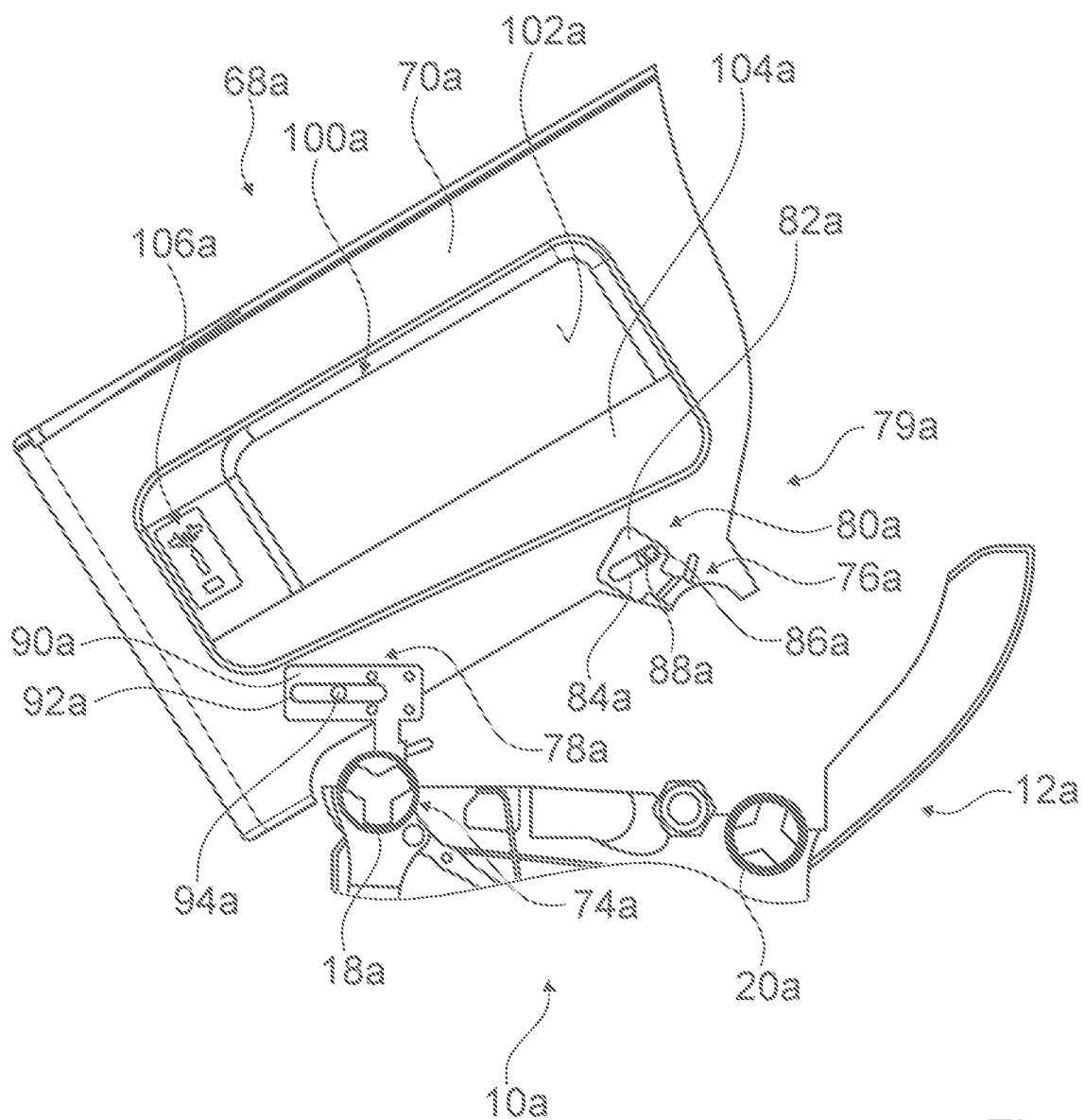
Figure 5:
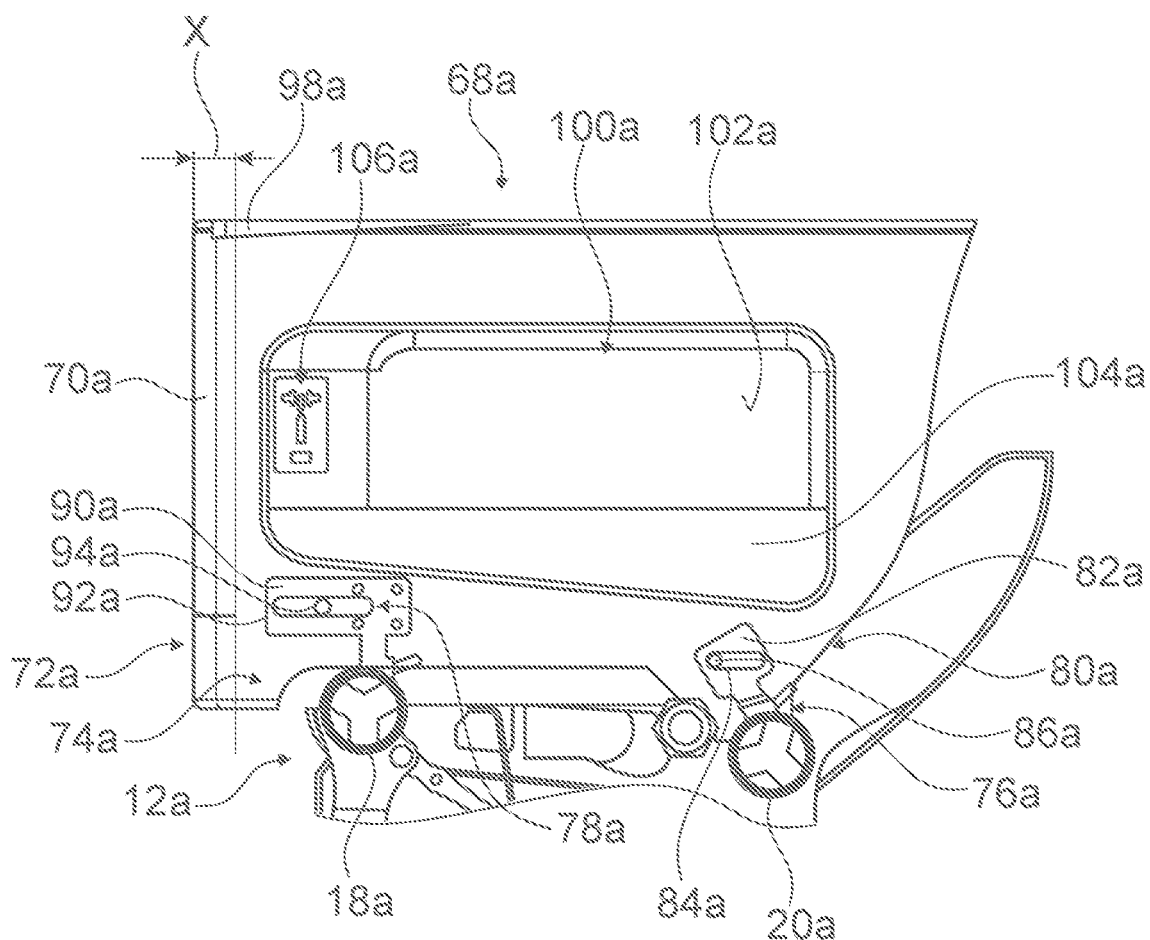
Figure 6:
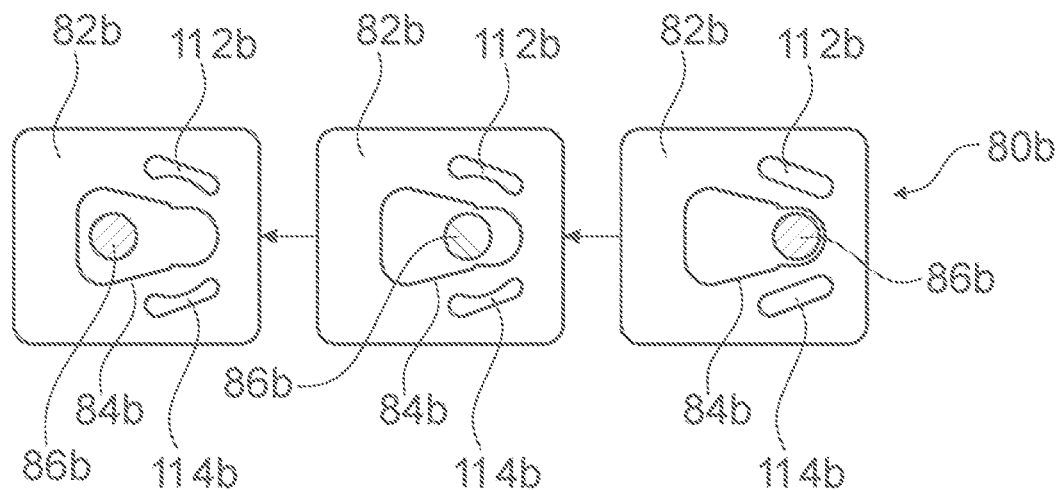
Figure 7:
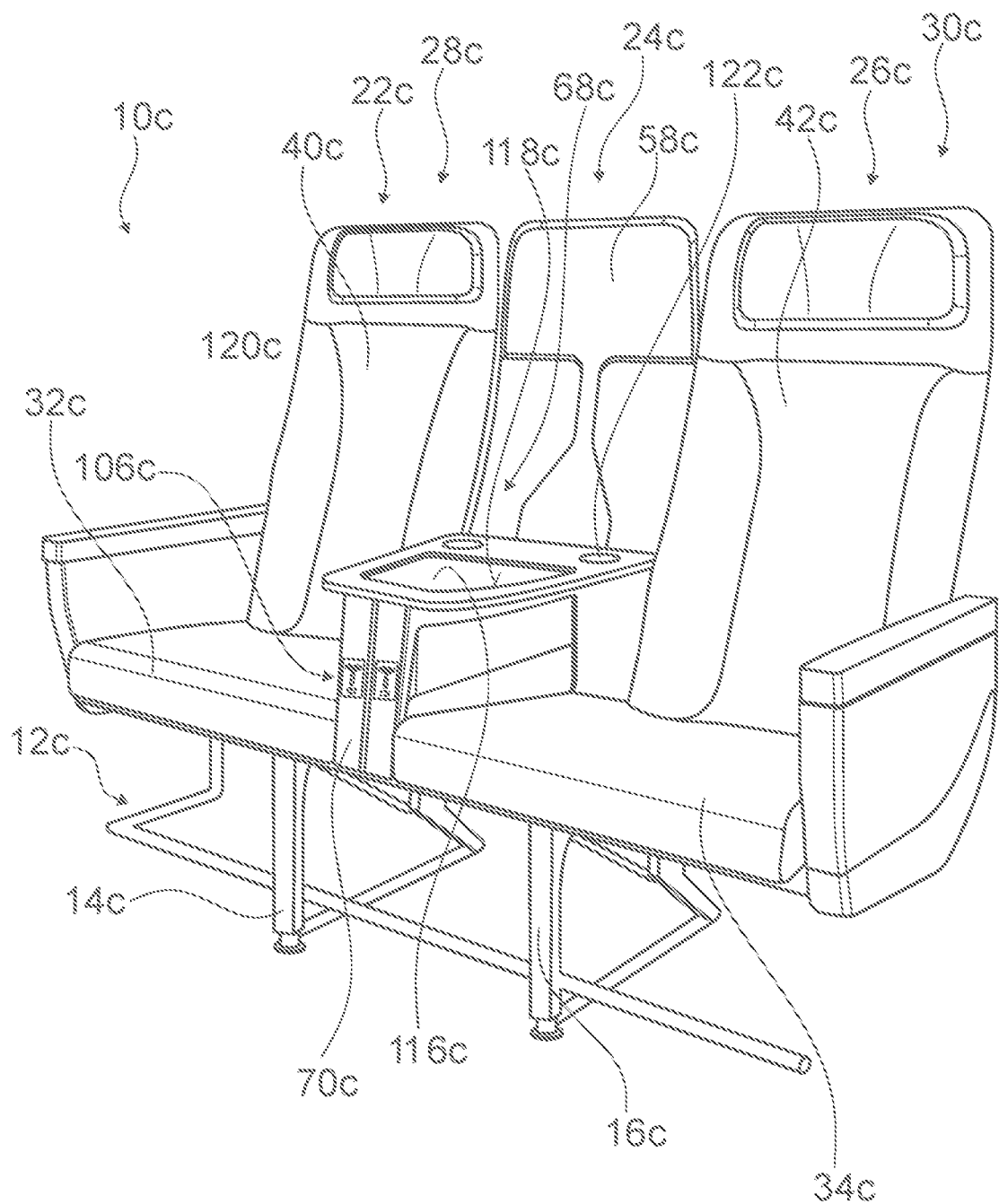
Figure 8:
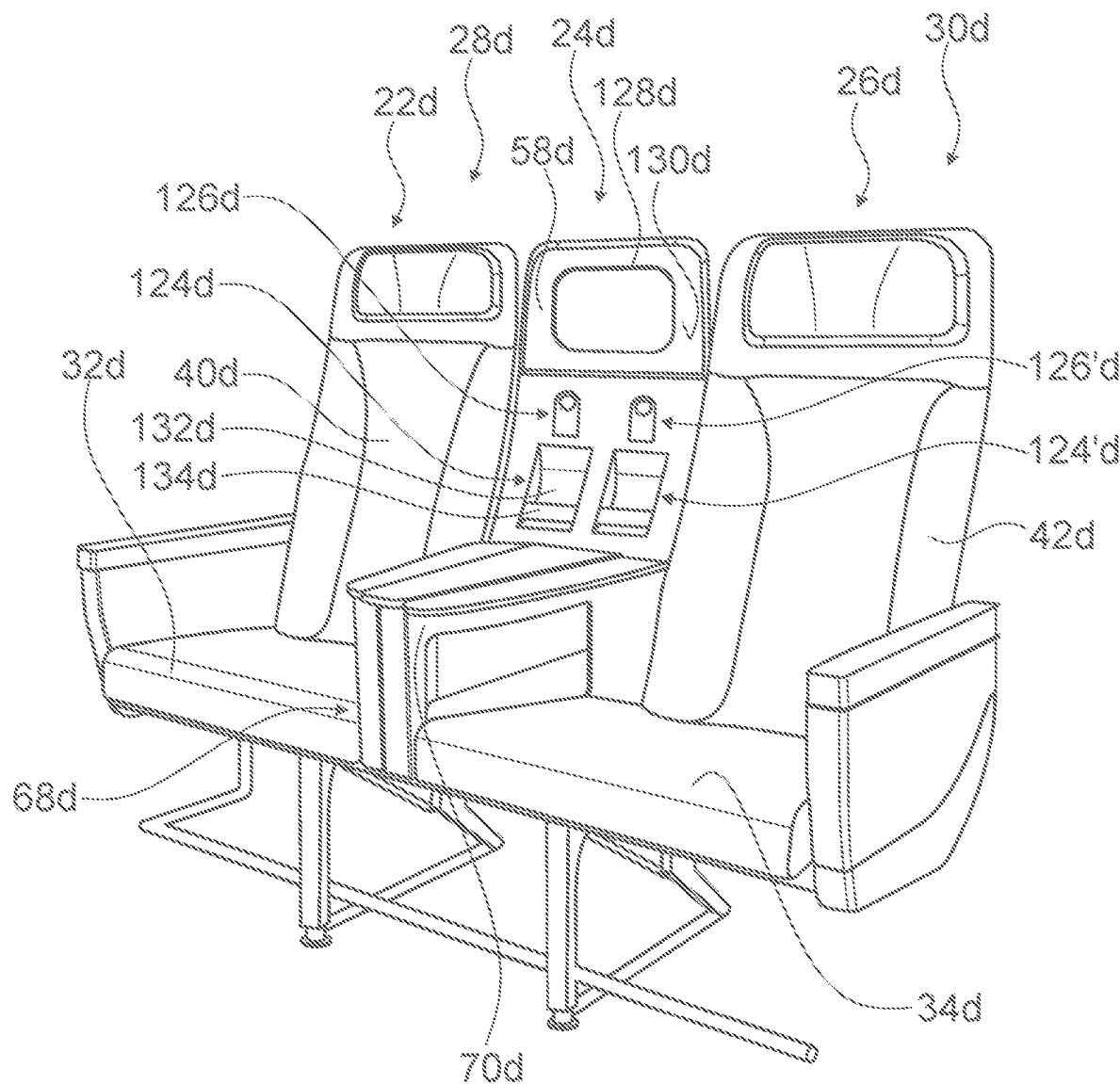
Figure 9:
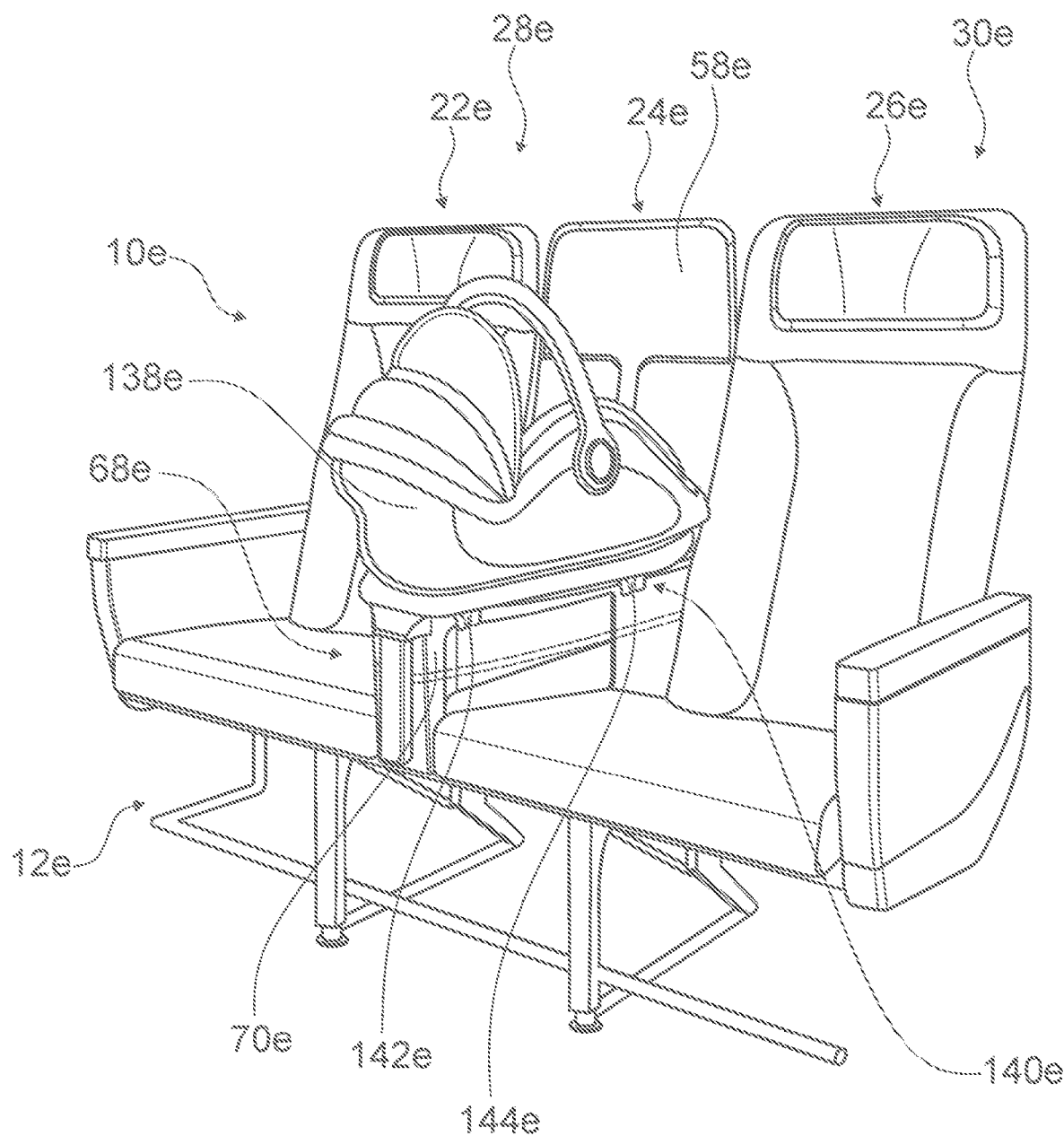

It is shown in:

FIG. 1 a schematic view of an aircraft seat device in a first embodiment with a seat row comprising three seat areas and a detachable center console arranged in the middle seat area, FIG. 2 a rear view of the seat row with backrest base body's comprising different functional elements, FIG. 3 a side view of the detachable center console attached to the mounting unit via connection elements of a connection unit, FIG. 4 a side view of the detachable center console in a partly decoupled state and pivoted forward, FIG. 5 a side view of the detachable center console with an impact safety device, FIG. 6 a schematic view of a slot and a pin element of the impact safety device in a second embodiment in three different stages of an impact, FIG. 7 a schematic view of an aircraft seat device in a third embodiment with a seat row comprising three seat areas and a detachable center console arranged in the middle seat area and FIG. 8 a schematic view of an aircraft seat device in a fourth embodiment with a seat row comprising three seat areas and a detachable center console arranged in the middle seat area, and FIG. 9 a schematic view of an aircraft seat device in a fifth embodiment with a seat row comprising three seat areas and a detachable center console arranged in the middle seat area and a baby basinet attached to the center console.

DESCRIPTION OF THE ILLUSTRATIVE EMBODIMENTS

FIGS. 1 to 5 show a first embodiment of an aircraft seat device according to the invention. The aircraft passengers seat device comprises a seat row 10a. The seat row 10a is provided to be mounted in an aircraft cabin. The aircraft seat row 10a is part of an airplane which is not further illustrated. Preferably there are more than one aircraft seat rows 10a mounted in the aircraft cabin. The aircraft seat rows 10a can be mounted behind one another or next to each other, wherein an aisle can be arranged between the aircraft seat rows 10a.

The aircraft seat row 10a comprises a mounting unit 12a. The mounting unit 12a comprises two seat legs 14a, 16a. The seat legs 14a, 16a of the mounting unit 12a are provided to mount the aircraft seat row 10a to a cabin floor. The mounting unit 12a comprises two fitting elements for each seat legs 14a, 16a, via which each seat legs 14a, 16a can be connected to a mounting rail of the aircraft cabin. The fitting elements are not shown in detail. The mounting unit 12a comprises two supporting tubes 18a, 20a. The supporting tubes 18a, 20a are mounted to the seat legs 14a, 16a. The supporting tubes 18a, 20a extend in a traverse direction of the seat row 10a. The supporting tubes 18a, 20a extend parallel to one another. Preferably the supporting tubes 18a, 20a extend over the entire width of the aircraft seat row 10a. It is also conceivable that the mounting unit 12a comprises more than two seat legs 14a, 16a and/or another quantity of supporting tubes 18a, 20a, The aircraft seat row 10a comprises three neighboring seat areas 22a, 24a, 26a. The neighboring seat areas 22a, 24a, 26a are arranged directly adjacent to one another. The middle seat area 24a is arranged between the two outer seat areas 22a, 26a. The two outer seat areas 22a, 26a delimit on their respective inner side the middle seat area 24a. The two outer seat areas 22a, 26a delimit on their outer side the aircraft seat row 10a. The three neighboring seat areas 22a, 24a, 26a divide the aircraft seat row 10a in three equally sized parts.

In each of the two outer seat areas 22a, 26a an aircraft seat 28a, 30a is arranged. The two aircraft seats 28a, 30a arranged in the outer seat areas 22a, 26a are for the most part identical or mirrored to each other. Each of the two aircraft seats 28a, 30a comprises a seat bottom 32a, 34a. Each seat bottom 32a, 34a is mounted to the mounting unit 12a. In particular each seat bottom 32a, 34a is mounted to the supporting tubes 18a, 20a of the mounting unit 12a. Preferably the seat bottom 32a, 34a is movably mounted to the supporting tubes 18a, 20a and can be moved between a comfort position and a TTL-position. It is also conceivable that the seat bottom 32a, 34a is fixed immovable to the mounting unit 12a. The seat bottom 32a, 34a has a seat bottom base body, which is not shown in more detail. The seat bottom base body forms a load bearing structure of the seat bottom 32a, 34a. The seat bottom 32a, 34a comprises a cushion unit 36a, 38a. The cushion unit 36a, 38a is connected to the seat bottom base body of the seat bottom 32a, 34a. The cushion unit 36a, 38a is detachably connected to the seat bottom base body. Preferably the cushion unit 36a, 38a is connected to the seat bottom base body of the seat bottom 32a, 34a via a plurality of hook and loop fasteners. The seat bottom base body of each seat bottom 32a, 34a is mounted to the supporting tubes 18a, 20a of the mounting unit 12a.

The two aircraft seats 28a, 30a each comprise a backrest 40a, 42a. The backrest 40a, 42a of the outer aircraft seats 28a, 30a is mounted to the mounting unit 12a. Preferably the backrest 40a, 42a is mounted pivotably to the mounting unit 12a. The backrest 40a, 42a can be pivoted between a TTL-position and a comfort position. In the TTL-Position the backrest 40a, 42a is oriented preferably essentially in an upright position. In the comfort position the backrest 40a, 42a is pivoted backwards to provide a more comfortable seating angle. The backrest 40a, 42a has a backrest base body 44a, 46a. The backrest base body 44a, 46a of the backrest 40a, 42a forms a load bearing structure of the backrest 40a, 42a. The backrest base body 44a, 46a may contain a load bearing frame and/or load bearing sheets, such as composite sheets. The backrest base body 44a, 46a of the aircraft seat 28a, 30a is mounted to the mounting unit 12a. Preferably the backrest base body 44a, 46a is mounted to the mounting unit 12a via a pivot mechanism. The backrest base body 44a, 46a can be coupled directly to the supporting tubes 18a, 20a of the mounting unit 12a or to another part of the mounting unit 12a such as seat spreaders. The backrest 40a, 42a comprises a backrest cushion unit 48a, 50a. The backrest cushion unit 48a, 50a is for example composed of a padding element and a cover element. Other embodiments of the backrest cushion unit 48a, 50a are also possible. The backrest cushion unit 48a, 50a is arranged on a front side of the backrest base body 44a, 46a. The backrest cushion unit 48a, 50a forms a back support surface for a passenger sitting on the aircraft seat 28a, 30a. The backrest cushion unit 48a, 50a comprises functional elements 52a, 54a, 56a, 52'a, 54'a, 56'a The functional elements 52a, 54a, 56a, 52'a, 54'a, 56'a are provided for passengers sitting on aircraft seats behind the aircraft seat row 10a. The functional element 52a, 52's is implemented as a literature pocket. The first functional element 52a, 52'a implemented as a literature pocket is arranged in an upper region of the backrest 40a, 42a in the backrest base body 44a, 46a. The functional element 52a, 52's implemented as a literature pocket is provided to hold literature or other objects. The second functional element 54a, 54's is implemented as a table unit. The second functional element 54a, 54'a implemented as a table unit is arranged in a middle area of the backrest 40a, 42a under the first functional element 52a, 52'a forming a literature pocket. The second functional element 54a, 54'a implemented as a table unit comprises a table element that can be pivoted in a use position. The second functional element 54a, 54'a implemented as a table unit may also comprise further elements such as a tablet holder or a cup holder. The third functional element 56a, 56'a is implemented as a literature net. The third functional element 56a, 56'a is arranged in a lower part of the backrest 40a, 42a and is attached to the backrest base body 44a, 46a.

In the middle seat area 24a no aircraft seat providing a sitting area for a passenger is provided. In the described operating state, the middle seat area 22a is free of an aircraft seat and no passenger can sit in the middle seat area 24a The middle seat area 24a comprises a backrest base body 58a. The backrest base body 58a of the middle seat area 24a forms a load bearing structure. The backrest base body 58a may contain a load bearing frame and/or load bearing sheets, such as composite sheets. The backrest base body 58a of middle seat area 24a is mounted to the mounting unit 12a. Preferably the backrest base body 58a is mounted to the mounting unit 12a in a fixed position in a normal operating state. The backrest base body 58a may be coupled directly to the supporting tubes 18a, 20a of the mounting unit 12a or to other part of the mounting unit 12a such as seat spreaders. The backrest base body 58a comprises functional elements 60a, 62a, 64a. The functional elements 60a, 62a, 64a are provided for a passenger sitting on an aircraft seat behind the aircraft seat row 10a. The functional elements 60a, 62a, 64a of the backrest base body 58a are arranged on a rear side 66a of the backrest base body 58a. The first functional element 60a is implemented as a literature pocket. The first functional element 60a implemented as a literature pocket is arranged in an upper region of the backrest base body 58a. The functional element 60a implemented as a literature pocket is provided to hold literature or other objects. The second functional element 62a is implemented as a table unit. The second functional element 62a implemented as a table unit is arranged in a middle area of the backrest base body 58a under the first functional element 60a forming a literature pocket. The second functional element 62a implemented as a table unit comprises a table element that can be pivoted in a use position. The second functional element 62a implemented as a table unit may also comprise further elements such as a tablet holder and/or a cup holder. The third functional element 64a is implemented as a literature net. The third functional element 64a is arranged and attached to the backrest base body 58a in a lower part. The functional elements 60a, 62a, 64a of the backrest base body 58a of the middle seat area 24a are implemented in a same way as the functional elements 52a, 54a, 56a, 52'a, 54'a, 56'a of the backrests 40a, 42a of the aircraft seats 28a, 30a of the outer seat areas 22a, 26a. This is beneficial if the seat row behind the described seat row 10a is a normal seat row with three aircraft seats. It is also thinkable that the other functional elements are arranged on the rear side 66a of the backrest base body 58a of the middle seat area 24a. Furthermore, it is conceivable, that the functional elements comprised by the backrest base body 58a are provided for passengers sitting in seats not directly behind the middle seat area 24a, but for passengers sitting in outer seats behind the outer aircraft seats 28a, 30a of the outer seat areas 22a, 26a. This is beneficial if the seat row behind the described seat row 10a is implemented as the seat row 10a with only two outer aircraft seats and no aircraft seat in the middle seat area 24.

The aircraft passenger seat device comprises a center console 68a. The center console 68a is provided to be arranged in the middle seat area 24a of the seat row 10a. The center console 68a is mounted detachably to the seat row 10a. The center console 68a is in one operating state detachably mounted to the mounting unit 12a of the seat row 10a. The center console 68a is in a mounted state arranged between the aircraft seats 28a, 30a of the outer seat areas 22a, 26a. The center console 68a is in a mounted state arranged in the middle seat area 24a. The center console 68a is provided to be mounted to the mounting unit 12a in the middle seat area 24a. The center console 68a is provided to form in a mounted state a separation between the outer seat areas 22a. 26a, in particular the seats 28a, 30a of the outer seat areas 22a, 26a. The center console 68a functions as a separation means between the aircraft seats 28a, 30a of the outer seat areas 22a, 26a and as mounting area for further functional elements for the aircraft seats 28a, 30a. The center console 68a has a width that is smaller than a width of the middle seat area 24a. The width of the center console 68a is preferably smaller than a width of the backrest base body 58a of the middle seat area 24a. The center console 68a has a height that is about the same height as a armrest of an aircraft seat 28a, 30a.

The detachable center console 68a comprises a base body 70a. The base body 70a of the detachable console forms a structural base of the detachable console 68a. The base body 70a forms a load bearing structure of the detachable center console 68a. The base body 70a of the center console 68a is implemented as a box. The center console 68a, especially the base body 70a defines an internal space. The base body 70a is preferably made from a fiber-reinforced plastic. In general, it is also conceivable, that the base body 70a is made from a different material, for example a light metal or a plastic material or a combination of both. The base body 70a has a width that is smaller than the width of the backrest base body 58a of the middle seat area 24a. The width of the base body 70a is between 8 inch (20 cm) and 12 inch (30 cm). The width of the base body 70a can be different in different areas of the base body 70a. It is for example possible that the base body 70a has a form that tapers off to the front.

The detachable center console 68a comprises a connection unit 72a. Via the connection unit 72a the detachable center console 68a mounted to the mounting unit 12a. The detachable center console 68a is connected directly to the supporting tubes 18a, 20a of the mounting unit 12a via the connection unit 72a. The connection unit 72a connects the center console 68a directly to the supporting tubes 18a, 20a of the mounting unit 12a in a mounted state. The connection unit 72a is mounted to the base body 70a of the detachable center console 68a. The mounting unit 72a comprises a front connection element 74a. The detachable center console 68a can be connected to the front supporting tube 18a of the mounting unit 12a via the front connection element 74a. The front connection element 74a is implemented as a form fit element. In a mounted state the connection front element 74a encompasses the front supporting tube 18a to form a form fit connection. The front connection element 74a may be implemented in different ways. It is also conceivable that the front connection element 74a is secured to the front supporting tube 18a via a clamp and/or screw connection. It is also conceivable that the front connection element 74a is a latching element, which latches onto the front supporting tube 18a in a mounted state. The mounting unit 72a comprises a rear connection element 76a via which the detachable center console 68a can be connected to a rear supporting tube 20a of the mounting unit 12a. The rear connection element 76a is implemented as a form fit element. In a mounted state the rear connection element 76a encompasses the rear supporting tube 20a to form a form fit connection. The rear connection element 76a may be implemented in different ways. It is also conceivable that the rear connection element 76a is secured to the rear supporting tube 20a via a screw connection. It is also conceivable that the rear connection element 76a is a latching element, which latches onto the rear supporting tube 20a in a mounted state. It is conceivable that the connection unit 72a comprises more than one front connection element 74a and/or more than one rear connection element 76a.

The connecting unit comprises an impact safety device 80a. The impact safety device 80a is provided to partly decouple the detachable center console 68a in an event of a crash. The impact safety device 80a is provided to partly decouple the detachable center console 68a in an event of a crash from the mounting unit 12a. The impact safety device is provided to partly decouple the center console 68a from the mounting unit 12a, so the detachable center console 68a can move forward by a distance X of at least two inch in an event of a crash. In an event of a crash the stiff connection between the center console 68a and the mounting unit 12a is partly decoupled, in an event of a crash the impact safety device 80a is provided to allow the center console 68a to move forward, away from the backrest base body 58a. The impact safety device 80a is partly integrated into the connection elements 74a, 76a. The impact safety device 80a comprises a first plate element 82a, that is connected to the rear connection element 76a. The impact safety device 80a comprises a slot 84a in in the plate element 82a. The slot 84a is oriented in a forward direction. The slot 84a is oriented parallel to a mounting plane the aircraft seat row 10a is mounted to. The impact safety device 80a comprises a pin element 86a. The pin element 86a is connected to the center console 6a8. The pin element 86a is fixed to the base body 70a of the center console 68a. In a mounted state the pin element 86a is arranged in the slot 84a in the plate element 82a. In a normal operation state the pin element 86a is arranged at a rear end of the slot 84a. The impact safety device 80a comprises a deformation element 88a. The deformation element 88a is provided to secure the pin element 84a in the rear end of the slot 84a in a normal operation state. The deformation element 88a is provided to close up or delimit a part of the slot 84a in such a way that the pin element 86a can not pass the deformation element 88a without destroying it. The deformation element 88a delimits the slot 84a and holds the pin element 86a in the normal position at the rear end of the slot in a normal operating state. The deformation element 88a is therefore provided to fix the pin element 86a in a normal use position in the slot 84a. Thereby the deformation element also holds the center console 68a, that is connected to the plate element 82a via the pin element 86a, in the normal use position in a normal operation state. In an event of a crash, forces act on the center console 68a in the forward direction. If the forces acting on the center console 68a and therefore on the pin element 86a in the forward direction are too high, the deformation element 88a is provided to break and give free the pin element 86a in the slot 84a. The deformation element 88a is being provided to be deformed by the pin element 86a in the event of a crash to release the pin element 86a in the slot 84a. In the event of a crash, when the deformation element 88a is broken, the pin element 86a can move relative to the slot 84a in the forward direction, allowing the whole center console 68a to move in the forward direction. By moving the entire center console 68a in the forward direction in the event of a crash, the backrest base body 58a of the middle seat area 24a can also pivot forward, thus improving possible impact forces for a passenger sitting in an aircraft seat behind the backrest base body 58a.

The impact safety device 80a comprises a further plate element 90a, that is integrated into the front connection element 74a. The plate element 90a comprises a slot 92a. The slot 92a is in a normal operation state oriented parallel to the slot 84a of the first plate element 82a. The impact safety device 80a comprises a second pin element 94a. The pin element 94a is connected to the center console 68a in a front area. The pin element 94a is fixed to the base body 70a of the center console 68a. In a mounted state the pin element 94a is arranged in the slot 92a in the plate element 90a. In a normal operation state the pin element 94a is arranged at a rear end of the slot 92a. The pin element 94a and the slot 92a form a front guiding element for the center console 68a. In an event of a crash, when the center console is moved forward, the pin element 94a can move inside the slot 92a.

The front connection element 74a comprises a hinge element 78a. The hinge element is provided to pivot the center console 68a relative to the front supporting tube 18a in a partly mounted state. The partly mounted state means in this case a state, where the center console 68a is connected to the mounting unit 12a only via the front connection element 74a but not via the rear connection element. The hinge element is integrated into the front connection element 74a. The hinge element 78a is formed by the pin element 94a and the slot 92a. The pin element 94a and therefore the center console 68a connected to the pin element 94a can be rotated in the slot 92a. FIG. 4 shows a side view of the center console 68a in a partly mounted state and pivoted relative to the front supporting tube 18a via the hinge element 78a. Via the hinge element 78a the center console 68a can be pivoted to the front so an area under the center console 68a can be accessed. It is conceivable that elements of the aircraft seat row 10a, for example an electronics unit is mounted in the middle seat area 24a to the mounting unit 12a. These elements can be easily accessed when the center console 68a is pivoted forward as shown in FIG. 4.

The detachable center console 68a comprises two foldable arm rests 96a, 98a. The foldable arm rests 96a, 98a are mounted on an upper end of the base body 70a of the center console 68a. Each arm rest 96a, 98a provided for one of the two outer aircraft seats 28a, 30a of the outer seat areas 22a, 26a. The arm rest 96a is provided for the aircraft seat 28a and arranged on a side of the center console 68a facing the aircraft seat 28a of the first seat area 22a. The arm rest 98a is provided for the second aircraft seat 30a and arranged on a side of the center console 68a facing the aircraft seat 30a of the third seat area 26a. The foldable arm rest 96a, 98a is connected to the base body 70a of the center console 68a via a hinge that is not shown in detail. The arm rest 96a, 98a can be pivoted between a use position and a stowed position via the hinge. In the use position the arm rest 96a, 98a is pivoted away from the center console 68a and is oriented in a 90 degree angle to a side of the base body 70a. In the stowed position the arm rest 96a is folded onto the center console 68a. In the stowed position the armrest 96a, 98a is oriented parallel to the side of the base body 70a of the center console 68a and preferably abuts the side of the base body 70a. The pivotable arm rest 96a, 98a can be locked in the use position and the stowed position locking unit that is not shown in detail.

The detachable center console 68a comprises two stowage compartments 100a. Each stowage compartment 100a is arranged on one lateral side of the center console 68a and is provided for the one adjacent aircraft seat 28a, 30a. The stowage compartment 100a is integrated in the side of the center console 68a. The stowage compartment 100a is formed by the base body 70a of the center console 68a. The stowage compartment 100a is formed by a recess 102a in the lateral side if the base body 70a of the center console 68a and a front plate 104a. The recess 102a and the front plate 104a form a hollow space which delimits the stowage compartment 100a at least partially. The stowage compartment 100a is provided to hold small items of the passenger, such as a cellphone, a book or other personal items. The detachable center console 68a further comprises a power outlet 106a. The power outlet is arranged in the recess 102a of the stowage compartment 100a. The power outlet 106a is provided to provide an electrical current for a passenger, for example to charge a cellphone or laptop. The power outlet 106a may also contain a USB-Port.

The seat bottom 32a. 34a of the outer seat 28a. 30a of the outer seat areas 22a, 26a extend into the middle seat area 24a. The seat bottom 32a, 34a with its cushion unit 36a, 38a extends into the middle seat area 24a in front of the backrest base body 58a of the middle seat area 24a. The seat bottom 32a, 34a extents from the outer side of the aircraft seat 28a, 30a to the center console 58a arranged in the middle seat area 2a. The seat bottom 32a. 34a has a width of 18 inch (460 mm). The seat bottom 32a, 34a protrudes into the middle seat area 24a by 7 inch (180 mm). The seat bottoms 32a, 34a of both outer aircraft seats 28a, 30a protrude into the middle seat area 24a. Both seat bottoms 32a, 34a have the same width. The seat bottom 32a, 34a forms a seating area for a passenger that is wider than the respective outer seat area 22a, 26a. The aircraft seat 28a, 30a in the outer seat areas 22a. 26a of the seat row 10a form a wide seating area, which enhances the comfort for a passenger sitting on the respective aircraft seat 28a, 30a. The width of the seating area of the aircraft seats 28a, 30a of the outer seat areas 22a, 26a is especially wider than a normal seating area of an aircraft seat of a normal seat row with three neighboring aircraft seats.

The backrest 40a, 42a of the two outer seats 28a, 30a of the outer seat areas 22a, 24a has an extended backrest cushion, extending into the middle seat area 24a. The cushion unit 48a, 50a of the backrest 40a, 42a extends in a mounted state into the middle seat area 24a. The cushion unit 48a, 50a extends from an outer side of the backrest base body 44a, 46a of the aircraft seat 28a, 30a to the backrest base body 58a of the middle seat area 24a. The cushion unit 48a, 50a of the backrest 40a, 42a bridges a distance between the backrest base body 44a, 46a of the backrest 40a, 42a of the outer aircraft seat 28a, 30a and the backrest base body 58a of the middle seat area 24a. The cushion unit 44a, 46a of the backrest 40a, 42a has a width that is greater than a width of the respective backrest base body 44a, 46a of the backrest 40a, 42a. The backrest base body 44a, 46a has a width of 18 inch (460 mm). The cushion unit 48a, 50a of the backrest 40a, 42a has a width of 21 inch. The cushion unit 48a, 50a protrudes into the middle seat area by 3 inch (76 mm). By the wider cushion units 48a, 50a of the backrest 40a, 42a a gap between the backrest base body 44a, 46a of the backrest 40a. 42a of the outer seat 28a, 30a and the backrest base body 58a of the middle seat area 24a can be closed. The cushion units 48a, 50a of the backrest 40a, 42a of both outer aircraft seats 28a, 30a protrude into the middle seat area 24a. Both cushion units 48a, 50a of the backrest 40a, 42a have the same width. The cushion units 48a, 50a of the backrest 40a, 42a form a backrest area for a passenger that is wider than the respective outer seat area 22a, 26a. The aircraft seat 28a, 30a in the outer seat areas 22a, 26a of the seat row 10a form a wide backrest area, which enhances the comfort for a passenger sitting on the respective aircraft seat 28a, 30a.

The backrest base body 58a of the middle seat area 24a comprises two cushioned areas 108a, 110a. The cushioned areas 108a, 110a are located in areas directly adjacent to the neighboring outer seat area 22a, 26a. Each cushioned area 108a, 110a is associated with one of the outer aircraft seats 28a, 30a. The cushioned areas 108a, 110a each comprise a cushion element, that is arranged on the front of the backrest base body 58a of the middle seat area 24a. The cushioned areas 108a, 110a are provided to enlarge a backrest area of the outer aircraft seats 28a, 30a into an area of the backrest base body 58a of the middle seat area 24a. The cushioned areas 108a, 110a are arranged directly adjacent to the extended cushion unit 48a, 50a of the backrest 40a, 42a of the respective outer aircraft seat 28a. 30a.

FIGS. 6 to 9 show four further embodiments of the invention. The following description and the figures are essentially restricted to the differences between the exemplary embodiments, wherein regarding equally denominated components, in particular regarding components with the same reference numeral, the figures and/or description from the other exemplary embodiments, in particular of FIGS. 1 to 5, may be considered. For distinguishing the exemplary embodiments, the letter "a" has been added to the reference numerals of the exemplary embodiment of FIGS. 1 to 4, wherein, in the exemplary embodiments of FIGS. 6 to 9, the letter "a" has been replaced by the letters "b" to "e".

FIG. 6 shows an alternative embodiment of an impact safety device 80b. FIG. 6 shows a plate element 82b with a slot 84b, a pin element 86b and a deformation element 88b of the impact safety device 80b in three different positions during an event of a crash. In contrast to the first embodiment, the deformation element 88b and the slot 84b are integrally formed. The slot 86*b* has a tapered extension. The deformation element 88*b* is formed by a narrowing of the slot 84*b*. The plate element 82*b* has two deformation slots 112*b*, 114*b* in the area of the deformation element 88*b*. The deformation slots 112*b*, 114*b* are provided so that the deformation element 88*b* can be deformed by the pin element 86*b* in the case of a crash.

FIG. 7 shows a third embodiment of an aircraft seat device according to the invention. The aircraft passengers seat device comprises a seat row 10*c*. The aircraft seat row 10*c* comprises a mounting unit 12*c*. The aircraft seat row 10*c* comprises three neighboring seat areas 22*c*, 24*c*, 26*c*. The neighboring seat areas 22*c*, 24*c*, 26*c* are arranged directly adjacent to one another. In the two outer seat areas 22*c*, 26*c* an aircraft seat 26*c*, 28*c* is arranged. In each of the two outer seat areas 22*c*, 26*c* an aircraft seat 28*c*, 30*c* is arranged. Each of the two aircraft seats 28*c*, 30*c* comprises a seat bottom 32*c*, 34*c*. The two aircraft seats 28*c*, 30*c* each comprise a backrest 40*c*, 42*c*. In the middle seat area 24*c* no aircraft seat providing a sitting area for a passenger is provided. The middle seat area 24*c* comprises a backrest base body 58*c*. The backrest base body 58*c* of the middle seat area 24*c* forms a load bearing structure. The aircraft seat row 10*c* with its outer seats 28*c*, 30*c* of the outer seat areas 22*c*, 26*c* and the middle seat area 24*c* are essentially identical to the first embodiment of FIGS. 1-5.

The aircraft passenger seat device comprises a center console 68*c*. The center console 68*c* is provided to be arranged in the middle seat area 24*c* of the seat row 10*c*. The center console 68*c* is mounted detachably to the seat row 10*c*. The center console 68*c* is in one operating state detachably mounted to the mounting unit 12*c* of the seat row 10*c*. The center console 68*c* is in a mounted state arranged between the aircraft seats 28*c*, 30*c* of the outer seat areas 22*c*, 26*c*. The detachable center console 68*c* comprises a base body 70*c*. The base body 70*c* of the detachable center console 68*c* forms a structural base of the detachable console 68*c*. The base body 70*c* forms a load bearing structure of the detachable center console 68*c*. In distinction to the first embodiment, the detachable center console 68*c* has other features. The center console 68*c* of the third embodiment has no pivotable armrests. The center console 68*c* comprises a table element 116*c*. The table element 116*c* is fixed to a top side of the base body 70*c* of the central console 68*c*. The table element 116*c* is implemented as a flat plate. The table element 116*c* has a recess 118*c* in its top surface. Furthermore, the table element 116*c* comprises two cup holders 120*c*, 122*c*. The cup holders 120*c*, 122*c* are formed by holes in the table element 116*c*. The central console 68*c* comprises at a front side two power outlets 106*c*.

FIG. 8 shows a fourth embodiment of an aircraft seat device according to the invention. The aircraft passengers seat device comprises a seat row 10*d*. The aircraft seat row comprises a mounting unit 12*d*. The aircraft seat row 10*d* comprises three neighboring seat areas 22*d*, 24*d*, 26*d*. The neighboring seat areas 22*d*, 24*d*, 26*d* are arranged directly adjacent to one another. In the two outer seat areas 22*d*, 26*d* an aircraft seat 26*d*, 28*d* is arranged. In each of the two outer seat areas 22*d*, 26*d* an aircraft seat 28*d*, 30*d* is arranged. Each of the two aircraft seats 28*d*, 30*d* comprises a seat bottom 32*d*, 34*d*. The two aircraft seats 28*d*, 30*d* each comprise a backrest 40*d*, 42*d*.

In the middle seat area 24*d* no aircraft seat providing a sitting area for a passenger is provided. The middle seat area 24*d* comprises a backrest base body 58*d*. The backrest base body 58*d* the middle seat area 24*d* forms a load bearing structure. The aircraft seat row 10*d* with its outer seats 28*d*, 30*d* of the outer seat areas 22*d*, 26*d* are essentially identical to the first embodiment of FIGS. 1-5. In distinction to the other embodiments, the backrest base body 58*d* comprises functional elements 124*d*, 124'*d*, 126*d*, 126'*d*. 128*d*, 128'*d* on its front 130*d*. The functional elements 124*d*, 124'*d*, 126*d*, 126'*d*, 128*d*, 128'*d* are integrated in the front 130*d* of the backrest base body 58*d* of the middle seat area 24*d*. The functional elements 124*d*, 124'*d*, 126*d*, 126'*d*, 128*d*, 128'*d* arranged in the front 130*d* of the backrest base body 58*d* of the middle seat area 24*d* are provided for the use by passengers sitting in the outer seats 28*d*, 30*d* of the outer seat areas 22*d*, 24*d*. The functional elements 124*d*, 124'*d*, 126*d*, 126'*d*, 128*d*, 128'*d* are provided to improve a comfort of passengers sitting in the outer seats 28*d*. 30*d* of the outer seat areas 22*d*. 24*d*.

The functional elements 124*d*, 124'*d* are implemented as a stowage compartment. Each functional element 124*d*, 124'*d* implemented as a stowage compartment is provided for one of the outer seats 28*d*, 30*d* of the outer seat areas 22*d*, 24*d*. The functional elements 124*d*, 124'*d* are identical, so that only the one functional element 124*d* is described below. The functional element 124*d* implemented as a stowage compartment comprises a recess 132*d* in the front 130*d* of the backrest base body 58*d*. The functional element 124*d* implemented as a stowage compartment comprises a holding element 134*d* delimiting the recess in a front. The holding element 134*d* can be implemented as a stiff plate or an elastic band. The holding element 134*d* is provided to hold objects in the recess 132*d* forming a stowage area of the functional element 124*d*. The functional element 124*d* implemented as a stowage compartment is provided such that a passenger sitting on the aircraft seat 28*d* can store personal items in it.

The functional elements 126*d*, 126'*d* are implemented as a cup holder. Each functional element 126*d*, 126'*d* implemented as a cup holder is provided for one of the outer seats 28*d*, 30*d* of the outer seat areas 22*d*, 24*d*. The functional elements 126*d*, 126'*d* are identical, so that only the one functional element 126*d* is described below. The functional element 126*d* implemented as a cup holder comprises a pivotable holding plate 136*d* mounted in the front 130*d* of the backrest base body 58*d*. The pivotable holding plate 136*d* comprises a hole in which a cup or a beverage can ban be arranged. The pivotable holding plate 136*d* can be pivoted between a usage position and a stowage position. It is also thinkable that the holding plate 136*d* of the functional element 126*d* implemented as a cup holder is mounted stiff to the front 130*d* of the backrest base body 58*d* in its usage position.

The functional element 128*d* is implemented as an advertisement element. The functional element 128*d* is provided such that advertisement or other messages can be displayed on it. The functional element 128*d* preferably comprises a frame element in which a printed advertisement can be placed. In another embodiment the functional element 128*d* implemented as an advertisement element may comprise a display on which advertisement can be displayed. Furthermore, it is conceivable, that the backrest base body 58*d* comprises at its front 130*d* more or other functional elements for use by a passenger. Fir example it is conceivable, that a further functional element is implemented as a tablet holder, a table device, a power outlet or a control panel.

The aircraft passenger seat device comprises a center console 68*d*. The center console 68*d* is provided to be arranged in the middle seat area 24*dd* of the seat row 10. The center console 68*d* is mounted detachably to the seat row 10*d*. The center console 68*d* is in one operating state detachably mounted to the mounting unit 12*d* of the seat row 10*d*. The center console 68*d* is in a mounted state arranged between the aircraft seats 28*d*, 30*d* of the outer seat areas 22*d*, 26*d*. The detachable center console 68*d* comprises a base body 70*d*. The base body 70*d* of the detachable center console 68*d* forms a structural base of the detachable center console 68*d*. The base body 70*d* forms a load bearing structure of the detachable center console 68*d*. The center console 68*d* is essentially identical to the first embodiment of FIGS. 1-5 and thus not further described.

FIG. 9 shows a fifth embodiment of an aircraft seat device according to the invention. The aircraft passenger seat device comprises a seat row 10*e*. The aircraft seat row 10*e* comprises a mounting unit 12*e*. The aircraft seat row 10*e* comprises three neighboring seat areas 22*e*, 24*e*, 26*e*. The neighboring seat areas 22*e*, 24*e*, 26*e* are arranged directly adjacent to one another. In the two outer seat areas 22*e*, 26*e* an aircraft seat 26*e*, 28*e* is arranged. In each of the two outer seat areas 22*e*, 26*e* an aircraft seat 28*e*, 30*e* is arranged. In the middle seat area 24*e* no aircraft seat providing a sitting area for a passenger is provided. The middle seat area 24*e* comprises a backrest base body 58*e*. The backrest base body 58*e* of the middle seat area 24*e* forms a load bearing structure. The aircraft seat row 10*e* with its outer seats 28*e*. 30*e* of the outer seat areas 22*e*. 26*e* and the middle seat area 24*e* are essentially identical to the first embodiment of FIGS. 1-5.

The aircraft passenger seat device comprises a center console 68*e*. The center console 68*e* is provided to be arranged in the middle seat area 24*e* of the seat row 10*e*. The center console 68*e* is mounted detachably to the seat row 10*e*. The center console 68*e* is in a mounted state arranged between the aircraft seats 28*e*, 30*e* of the outer seat areas 22*e*, 26*e*. The detachable center console 68*e* comprises a base body 70*e* The base body 70*e* of the detachable center console 68*e* forms a structural base of the detachable console 68*e*. The base body 70*e* forms a load bearing structure of the detachable center console 68*e*. In general the detachable center console 68*e* can have similar features as the one of the previous embodiments. In addition to the center console of the previous embodiments the center console 68*e* of the fifth embodiment is provided, such that a child seat, a baby seat or a baby bassinet 138*e* can be arranged on it. The center console 68*e* is provided so that a baby basinet 138*e* or a baby seat or child seat are fixable thereto. In FIG. 9 the baby basinet 138*e* is shown as an example for the different possibilities. The center console 68*e* has an attachment module 140*e* for arranging the baby basinet 138*e* or the baby/child seat on the center console 68*e*. The attachment module 138*e* has on each side of the center console 68*e* at least one, preferably more than one attachment element. The attachment elements are embodied as force and/or form fit elements. The attachment elements of the attachment module 140*e* are not shown in detail. The baby basinet 138*e* has force and/or form fit elements 142*e*, 144*e*, that are formed corresponding to the attachment elements of the attachment module 140*e*. The force and/or form fit elements 142*e*, 144*e* are provided to be connected to the attachment elements of the attachment module 140*e* in a form fit and/or force fit manner. A child seat or a baby seat which is provided to be attached to the center console 68*e* has similar force and/or form fit elements, via which the baby seat or child seat can be mounted to the center console 68*e* via the attachment elements of the attachment module 140*e*. The baby seat, the child seat and the baby basinet 138*e* are provided to be connected to the center console 68*e* using the same attachment elements of the attachment module 140*e* for attachment. It is also conceivable, that the center console 68*e* could be dividable, so that the upper part could be removed for attachment of the baby basinet 138*e*, a baby seat or a child seat. The center console 68*e* in this case has implemented fixation means in its lower part of for the attachment of the basinet or child/baby seat.

In general, it is possible in all embodiments to replace the center console 68 and to put an additional seat bottom and seat belts in the middle seat area 24 instead of the center console to use the seat as a "standard" triple seat. In this case the wider seat bottoms and the wider backrest are preferably exchanged for normal sized seat bottoms and backrests. Therefore, it is possible to change the layout of the aircraft seat rows according to the invention between flights and the seat rows and the available seats can be adapted to the demand for specific flights. For this the backrest base body could be exchanged entirely or a cushion element could be fixed to the proposed backrest base body 58 of the center seat area. Furthermore, armrests could be added to the between the center seat area and the outer seat areas.

The invention claimed is:

1. An aircraft passenger seat device comprising an aircraft seat row, comprising:

a mounting unit, at least three neighboring seat areas, wherein in the two outer seat areas an aircraft seat with a seat bottom and a backrest is mounted to the mounting unit, wherein in the middle seat area a backrest base body is mounted to the mounting unit, wherein in at least one operating state a detachable center console is detachably mounted to the mounting unit in the middle seat area forming a separation between the two outer seats, wherein the backrest base body has at least one functional element on its rear side provided for the use by a passenger sitting behind, and a connection unit comprising an impact safety device, which is configured to partially decouple the detachable center console in an event of a crash, so the detachable center console can move forward by a distance X of at least one inch.

2. The passenger seating arrangement according to claim 1, wherein the detachable center console is connected directly by the connection unit to supporting tubes of the mounting unit.

3. The passenger seating arrangement according to claim 2, wherein the connection unit comprises a front connection element via which the detachable center console can be connected to a front supporting tube and rear connection element via which the detachable center console can be connected to a rear supporting tube.

4. The passenger seating arrangement according to claim 2, wherein the front connection element comprises a hinge element via which the console element can be pivoted relatively to the front supporting tube in a partly mounted state.

5. The passenger seating arrangement according to claim 1, wherein the impact safety device comprises a pin element connected to the detachable center console and a slot in an element connected to the mounting unit, in which the pin element is arranged.

6. The passenger seating arrangement according to claim 5, wherein the impact safety device has a deformation element delimiting the slot and holding the pin element in a first position in a normal operating condition, the deformation element being provided to be deformed by the pin element in the event of a crash to release the pin element in the slot.

7. The passenger seating arrangement according to claim 1, wherein the seat bottom of at least one of the two outer seats of the outer seat areas extends into the middle seat area.

8. The passenger seating arrangement according to claim 1, wherein the backrest of at least one of the two outer seats of the outer seat areas has an extended backrest cushion, extending into the middle seat area.

9. The passenger seating arrangement according to claim 1, wherein one functional element on the rear side of the backrest base body is implemented as a literature pocket, a table, a tablet holder, a cup holder and/or a literature net.

10. The passenger seating arrangement according to claim 1, wherein the detachable center console comprises at least one foldable armrest, a storage compartment, a power outlet and/or a table element.

11. The passenger seating arrangement according to claim 1, wherein the backrest base body comprises at least one functional element on the front.

12. The passenger seating arrangement according to claim 11, wherein the functional element on the front of the backrest base body is a stowage compartment, a tablet holder, a foldable cupholder element and/or advertisement element.

13. The passenger seating arrangement according to claim 1, wherein the center console is provided so that a baby basinet, a baby seat or a child seat are fixable thereto.

14. An aircraft passenger seat device comprising an aircraft seat row, comprising:
   a mounting unit,
   at least three neighboring seat areas,
   wherein in the two outer seat areas an aircraft seat with a seat bottom and a backrest is mounted to the mounting unit,
   wherein in the middle seat area a backrest base body is mounted to the mounting unit,
   wherein in at least one operating state a detachable center console is detachably mounted to the mounting unit in the middle seat area forming a separation between the two outer seats,
   wherein the backrest base body has at least one functional element on its rear side provided for the use by a passenger sitting behind,
   wherein the detachable center console comprises a base body which forms a structural base of the detachable center console, and
   wherein the base body of the detachable center console is implemented as a box, wherein the detachable center console includes two foldable arm rests mounted on an upper end of the base body of the detachable center console.

15. The passenger seating arrangement according to claim 14, wherein the base body of the detachable center console defines an internal space.

16. The passenger seating arrangement according to claim 14, wherein
   the detachable center console further includes two stowage compartments, each stowage compartment of the two stowage compartments is arranged on one lateral side of the detachable center console and is provided for the aircraft seat of one of the two outer seat areas,
   the each stowage compartment is formed by a recess in the one lateral side of the base body of the detachable center console and a front plate.

* * * * *